United States Patent [19]
Cobble

[11] 3,892,853

[45] July 1, 1975

[54] STABILIZED ALOE VERA GEL AND PREPARATION OF SAME

[75] Inventor: Henry H. Cobble, Garland, Tex.

[73] Assignee: Aloe "99" Incorporated, Dallas, Tex.

[22] Filed: Jan. 25, 1971

[21] Appl. No.: 109,565

Related U.S. Application Data

[63] Continuation of Ser. No. 640,358, May 22, 1967, abandoned.

[52] U.S. Cl................................. 424/195; 424/58
[51] Int. Cl............................................. A61k 27/14
[58] Field of Search..................................... 424/195

[56] References Cited
UNITED STATES PATENTS
3,360,511   12/1967   Farkas............................... 424/258

OTHER PUBLICATIONS
Sagarin, 1957, Cosmetics Science and Technology, pp. 86, 404, 405 and 1053-1063.

Primary Examiner—Albert T. Meyer
Assistant Examiner—Dale R. Ore
Attorney, Agent, or Firm—Richards, Harris & Medlock

[57] ABSTRACT

A process for stabilizing the clear gel of Aloe vera leaves to provide a durable preparation preserving the therapeutic qualities of the fresh gel. The preparation has utility to relieve pain and promote healing of topical wounds and other lesions. Catalytic proportions of nontoxic oxidant are added to a prepared amount of fresh gel, which is brought to a temperature of from about 35° C. to about 80° C. A nontoxic antioxidant is added to poison the catalytic oxidant. Moreover, a nontoxic buffer is added to maintain pH at a range between about 4 and 6. Preferably a nontoxic surfactant is added so that coagulation will not be present in the stabilized gel material of the invention. Also, tocopherols may be added to give color stability to the gel preparation. Preferably sorbitol is utilized along with a deoxidant and tocopherols to prevent bacterial degradation of the gel.

10 Claims, No Drawings

STABILIZED ALOE VERA GEL AND PREPARATION OF SAME c. RELATED APPLICATIONS

This application is a continuation of copending application Ser. No. 640,358, filed May 22, 1967, now abandoned. d.

FIELD OF THE INVENTION

This invention relates to a stabilized Aloe vera gel as well as to the method of preparing the same.

THE PRIOR ART

Aloe vera, a tropical or subtropical plant of the genus Aloe, has lance shaped leaves with jagged edges and sharp points. The leaves contain a viscous but essentially clear gel given structural rigidity by hairlike connective fibers that run through it. Freshly excised from the plant and applied in vitro, this gel has been used medicinally for centuries by those living where the plant normally grows to relieve the pain of plant and animal stings, such as jellyfish stings.

The clear gel of Aloe vera is to be distinguished from the thick, mucilaginous yellow juice that occurs about the base of the plant leaves and adjacent the rind of the leaf. This juice, known as aloin, has been used for many years as an ingredient in many carthartics and purges.

The therapeutic qualities of the clear gel of the Aloe vera depend on the freshness of the gel. For example, the pain of a jellyfish sting may be stopped not to recur by applying the clear gel from a leaf that has just been cut, but if the gel has been exposed to air and light for about one and a half hours, these powers are completely lost. Gel that has been removed from a freshly cut leaf for as little as three hours is only about forty percent as effective as fresh gel. Yet fever blisters have been treated successfully with gel that has been extracted for several weeks, though not with gel as old as three months. Apparently, the varying efficacy of the fresh gel for different medicinal purposes reflects the fact that the gel is a complex mixture of substances whose stability on exposure to air and light differ from one another.

In addition to loss of therapeutic efficacy on aging, decomposition products occur after a short time that make the natural gel even less useful than it might be. For example, the commercially available gel extracts are most difficult to compound into cream bases for tropical application because the decomposition products tend to bring about a separation of the cream emulsion. Attempts to use the qualities of the gel in cosmetic preparations have been frustrated since such formulations usually become discolored after about a month, adversely affecting their cosmetic utility. In addition to these difficulties, gel that is over three to four weeks old typically becomes rancid and malodorous. At room temperature (about 70°–80° F.) it may become rancid within 24 hours of cutting. At room temperature under an inert atmosphere it may last as long as five weeks. Under refrigeration it may last as long as six weeks. Sooner or later, however it is kept, it will break down and become unpleasant to work with and will have lost its efficacy.

SUMMARY

The present invention is directed to a method of stabilizing the clear gel of Aloe vera leaves to provide a durable preparation having utility to relieve pain and promote healing of internal and external wounds.

In accordance with the invention, a catalytic proportion of a nontoxic oxidant is added to a prepared amount of gel which is heated to a temperature of from about 35° C. to about 80° C. for a predetermined period of time. A sufficient proportion of nontoxic antioxidant is then added to poison the catalytic oxidant, and relative to the added antioxidant, sufficient proportions of a nontoxic buffer are added to maintain the pH of the preparation at a value between pH 4 and pH 6.

In a further aspect of the invention a nontoxic surfactant that will not produce an alkaline pH for the amount of buffer present is added in effective amounts to disrupt and prevent coagulation of gel substance. In another aspect of the invention, effective concentrations of tocopherols are added to make the stabilized preparation color stable. In yet another aspect, sufficient proportions of sorbitol, a suitable deoxidant and tocopherols are added to forestall bacterial degradation of gel substrate substances.

THE PREFERRED EMBODIMENTS

Preliminary to chemically stabilizing the clear, fresh gel of Aloe vera, the gel must first be separated from its source and, secondly, prepared for solution treatment.

The gel is obtained from the leaves of a mature Aloe vera plant. Maturity is measured by all active ingredients being present in the leaf, and a two year plant is normally mature. Four or five year plants are preferred, however, because they have broader leaves that are easier to handle and contain larger amounts of gel, a factor that lowers percent gel losses when gel is separated from the leaf. In instances where plants are not grown under controlled conditions, the relative proportions of the gel substances is variable, and this causes measuring problems in determining quantity of reactants needed in stabilizing the gel. To minimize such problems, it is preferred that plants be grown under controlled conditions.

Whatever the relative quality of the plant, best results are obtained and generally less treatment is required when the leaves are processed immediately after cutting, the sooner the better. This is because degradative decomposition of the gel material begins on cutting due to natural enzymatic reactions and to the activity of bacteria that are normally present in the leaves. After cutting, the leaves are carefully washed in tap water with a suitable detergent, soaked for about 5 minutes in a suitable nonirritative bacteriocide and fungicide such as Micro-phene, washed with sterilized water, and then dried with a hard finished towel so as not to leave any lint on the plant. Then the gel is separated from the leaf by peeling away the outer green cortex of the leaf carefully to prevent any of it from adhering to the gel matrix. Any bruised or discolored areas, which may contain prussic acid, are removed since prussic acid will destroy the activity of the gel. Finally, the separated gel matrix is prepared for solution treatment by homogenizing it to break up the interstitial fibers running through it, using, for example, a high speed stirrer or blender.

The first step in stabilizing a prepared batch of clear gel from Aloe vera leaves is to add catalytic proportions of a nontoxic oxidant. Either before or after adding the nontoxic oxidant in the necessary amounts, but preferably before, the gel preparation is brought to a temperature within a range of from about 35° C. to about 80° C. The nontoxic oxidant is added with stirring, and heating is continued until the solution assumes a lighter appearance, at which time oxidation is essentially complete. Generally this takes no longer than about 30 minutes, but in some instances, positive results have been obtained almost immediately upon adding the oxidant. The time required for oxidation varies with the exact temperatures used and from batch to batch of gel preparations. In general, the change in appearance has most easily and most often been obtained when the oxidant has been added to a preparation that was then held at a temperature of about 49° C. for around 10 minutes.

The preferred material for catalytic oxidation is hydrogen peroxide, which is nontoxic, readily available, and relatively inexpensive. Best results have been obtained using hydrogen peroxide in 30% aqueous solution in quantities of about 0.25 milliliters per 5 liters of prepared gel. When proportionate quantities of 30% hydrogen peroxide solution have been added to smaller volumes of gel preparation precipitative floculation of the gel substance has tended to occur, ruining the preparation. Thirty percent solutions of hydrogen peroxide are preferred to the commercially available 3% hydrogen peroxide solutions, whose use in proportionate volumes has been often accompanied with floculation and precipitation of gel substances. The indicated quantity of 30% hydrogen peroxide is about three times that which seems minimally necessary to provide catalytic oxidation of the gel substances of most 5 liter batches. The excess of hydrogen peroxide is used to accommodate the internal variation in the amount of gel substances which may occur from batch to batch and does not affect the catalytic oxidation of this step. In general, excess quantities do nothing more than dilute the gel preparation, but if they are added in extreme amounts, they may make the stabilized gel uncomfortable to skin to which the gel is applied.

After a period sufficient to allow generally complete oxidation of certain of the gel substances, believed to be beta-globulin proteins, and perhaps, alpha-globulin proteins, effective proportions of a nontoxic antioxidant are mixed into the gel preparation to prevent further oxidation. Sorbic acid or the potassium salt of sorbic acid are preferred antioxidants, principally because they are nontoxic and fungistatic and/or bacteriostatic. They are also tasteless and odorless. Potassium sorbate preferred over sorbic acid since it is more soluble. Best results have been obtained using potassium sorbate in quantities of about 2 milligrams percent of gel solution preparation. This is about four times the concentration of sorbic acid necessary to curtail the catalytic oxidation reaction in most cases, the extra amount being used to contain the excess of oxidant that remains after accommodation of the varying amounts of gel substances and to assure complete cessation of oxidation. Larger amounts of sorbic acid and/or a nontoxic sorbic acid salt do not affect the stabilization of the gel, but in the stabilized gel they will irritate the skin of the person to which they are applied if present in amounts of around 1% of the gel.

Other antioxidants may be used. In some applications, ethylenediaminetetraacetic acid (EDTA) is an antioxidant of choice, such as when EDTA would itself be indicated as a topical application. One such example would be for chemical burns from arsenic oxide. EDTA is, however, unsuitable if its application would be contradicted. EDTA is also unsuitable if the stabilized gel is to be used in a cream base, for cream bases compounded with an EDTA-antioxidant stabilized gel tend to separate after a relatively short time. EDTA is apparently unable to prevent the bacterial decomposition of gel substrate substances and the formation of the products that cause the cream to separate. In contrast, it appears that ascorbic acid and potassium sorbate do inhibit or stop such degradations, for there is no breakdown of cream bases that contain a stabilized gel prepared with ascorbic acid or potassium sorbate.

Where sorbic acid is the antioxidant of choice, a nontoxic buffer is added and mixed into the gel solution in proportions relative to the sorbic acid effective to maintain the pH of the gel solution at a value between pH 4 and pH 6. Absent such a buffer, after about four to five days the solution tends to have an alkaline pH, which makes the sorbic acid ineffective to counter oxidation. With the nontoxic buffer the solution is kept at a relatively mild acid pH, and the sorbic acid is enabled to continuously guard against oxidation. Ascorbic acid provides an ideal buffer for this purpose. It buffers from pH 5 to pH 5.5; it is nontoxic at these levels; and it provides a media on which few commonly encountered bacteria will grow. With sufficient proportions of ascorbic acid to maintain pH at 5 to 5.5, sorbic acid has been able to curtail oxidative decomposition for periods of at least twenty months. Best results have been obtained using ascorbic acid in concentrations of about 2 milligrams percent of gel solution. This is usually about three times as much as needed to maintain the pH at desired levels. The extra quantities provide processing convenience to take account of such differences in gel substances as may occur between batches. Although greater amounts of ascorbic acid may be used without endangering the stabilization process, such amounts are generally unnecessary and if present in concentrations as large as about 5% of the stabilized gel juice, will cause the juice to chafe the skin of those to whom it is applied.

Another buffer that is suitable in terms of nontoxicity and buffer range is phosphoric acid. This buffer, however, provides a media in which most bacteria grow luxuriantly, and a gel stabilized with it is easily contaminated with such air-born bacteria as *Bacillus sutillius*, *Penicillium notatum*, and the streptomycin groups. This means that wounds painted with such a stabilized gel are susceptible to dangerous infections. For this reason, phosphoric acid is not favored for normal topical use. Where bacterial contamination is of secondary importance, however, phosphoric acid sufficiently meets the requisites of the defined buffer.

Prepared gels treated as described have been found to have the healing qualities of fresh Aloe vera gel for periods of at least twenty months. However, treated only as described, such substrate substances in the juice of the stabilized gel as glucose and glucose polymers are subject to bacterial degradation into fermentation products such as ethyl alcohol. This is undesirable if the stabilized gel juice is to be mixed into a cream base, because the fermentation products cause the cream to separate and also, because it gives the preparation an unpleasant odor and appearance. Accordingly, the following additives are utilized to prevent bacterial and/or fungal action on the stabilized gel juice.

A nontoxic surfactant that will not produce an alkaline pH, relative to the amount of buffer present, is added in proportions effective to disrupt and prevent any further coagulation of gel substance such as may have occurred on addition of the catalytic oxidant. Although there have been indications, as explained hereafter, that the gel substance, or part of it, when dispersed, inhibits or prevents the unwanted bacterial action itself, completely apart from any action of the surfactant, it is preferred to add a nontoxic surface active agent that is bacteriocidal and/or fungicidal, such as cetyl alcohol. Best results have been obtained using about 1 milligram percent cetyl alcohol for gel solutions, which appears to be about three times as much as is required but is convenient for processing different batches. The amount of cetyl alcohol that can be added is limited by its solubility under the defined conditions. It has been found desirable to use a small amount of polyoxyethylene (20) sorbitan monooleate to increase the solubility of cetyl alcohol. Excess amounts of cetyl alcohol do not seem to affect the results obtained using the smaller amounts, and accordingly, are merely wasteful.

Other surfactants have been tested but are not favored for various reasons. For example, the polyoxyethylene derivatives of the fatty acid partial esters of hexitol anhydrides, such as Tween 40, Tween 60 and Tween 80, provide mediums upon which bacteria, especially acid fast bacteria, grow luxuriantly. Thus, as a bacteriocide it is self defeating. Sodium lauryl sulfate has the disadvantage that it tends to raise pH values to alkaline levels, and is toxic, as defined below, at these concentrations. It is further unpleasant to work with in that it produces extremely foamy solutions.

It was indicated above that the dispersed gel substances in whole or in part may be antibacterial. This is based on the fact that a surfactant that is not bacteriocidal but which does not support bacterial growth, Hespiraden dicalcone, effectively disbursed clumped gel substances, and the stabilized gel so treated had no bacterial decomposition difficulties. An apparent minimum concentration of three milligrams percent gel solution was used.

Stabilized Aloe vera gels which have been treated to avert bacterial action have been found to have a total copper reducing substance of about 25–50 milligrams percent by the modified method of Folin and Wu, as well as an acid phosphatase value of about 0.05–0.2 sigma units. Direct hemolytic activity has been 0.1% when diluted 1 to 1 with a 0.9% sodium chloride solution, using 0.1 milliliters heparinized fresh human blood to 2–3 milliliters of the stabilized gel solution and allowing the solution to stand at room temperature for about 30 minutes. No growth has been observed on a blood agar plate incubated for 24–48 hours after inoculation with a broth culture prepared by placing 0.2 milliliters of stabilized Aloe gel in 5 milliliters of sterile tryptose broth and heated for 24 hours at 37° C. The blood agar plate was inoculated with 0.5 milliliters of the broth culture after streaking for 24 hours at 37° C.

Although the Aloe vera gel treated as disclosed has been found stabile and free from oxidative decomposition for at least 20 months, certain color changes have been observed in some of these gels during that period. If the gel was heated to 35° C. during the oxidation process, the preparation was likely to assume a neutral beige tint. Heating the gel to 37° C. tended to produce a pink tint in the preparation. Tints of purple, green and red, respectively often occurred if the temperature was raised in the oxidative stage to 50° C., 55°–56° C., or 62° C. The color changes were noted to occur with or without the exposure of the stabilized gel to oxygen. Although such color changes have not affected the therapeutic efficacy of the stabilized preparations, they are deemed undesirable because psychologically a preparation that changes color on the shelf appears spoiled. Accordingly, one aspect of this invention contemplates adding to stabilized gel preparations a quantity of tocopherols effective to prevent color changes. In many applications, amounts of about 0.01 milligrams percent of gel preparation has been sufficient to prevent such changes.

The following are examples given to explain in more detail this invention. It is not intended that they be considered as limiting the scope of the invention, since they are illustrative only, and by no means exhaustive.

Example 1

Mature Aloe vera leaves were cut from the plant and the gel of each leaf was immediately removed and prepared for solution treatment by homogenizing it in a high speed blender. Five liters of the prepared fresh gel were warmed to 49° C. and 0.25 milliliters of 30% hydrogen peroxide were added with vigorous stirring until a transient blanching was observed, which took about 10 minutes. Some turbidity resulted from clumping of gel particles and a sweet ester oil odor was noticed. (Other experiments showed that if the temperature was not raised to at least 35° C. during the oxidation step, such a color change would not be observed.) Then the preparation was allowed to come to room temperature and reagents A, B, and C, prepared as follows, were sequentially added and mixed into the oxidized gel preparation, using the following respective milliliter volumes, 10:5:10. Reagent A was a 1% solution of sorbic acid in 95% ethanol, and was prepared by adding one gram of potassium sorbate to 100 milliliters of 95% ethanol. Reagent B was a 1% solution of cetyl alcohol prepared by dissolving one gram of cetyl alcohol into 50 milliliters of 95% ethanol; mixing in one milliliter of polyoxyethylene (20 ) sorbitan monooleate until dissolved; and then bringing the volume to 100 milliliters with 95% ethanol. Reagent C was a 1% solution of L-ascorbic acid prepared by dissolving one gram of L-ascorbic acid in 100 milliliters of ethanol; stirring in until dissolved one milliliter of polyoxyethylene (20) sorbitan monooleate; and adding sufficient 95% ethanol to bring the volume to 100 milliliters.

After the oxidized gel was treated with the reagents, it was concentrated by lyophilization with liquid nitrogen to a predetermined concentrate volume. It was then transferred to amber bottles and kept in a cool place for future use.

The stabilized Aloe vera gel was tested by physicians and dentists and found to be fully as effective, therapeutically, as fresh extracts of the gel. It was found to vanish pain and promote rapid healing in dental surgery. Tests, such as follow, have shown it it be nontoxic in the sense that it is not a primary skin irritant.

Example A

Rabbits were injected intradermally with a predetermined aliquot of either fresh gel, stabilized gel prepared according to the present method, or 24-hour old unstabilized gel. Normal sterile physiological saline solutions were similarly injected as controls. The injection areas were examined after 24 hours for evidence of primary skin irritation such as abcess and necrosis of the epidermal layers. The 24-hour old unstabilized gel injection produced a marked reaction, but the fresh and stabilized gel extracts produced even less irritation than the normal sterile physiological saline solutions.

Example B

The procedures of Example A were followed except that the rabbits were injected with stabilized gel prepared by the present method over a period of about seven weeks. In some cases the samples of stabilized gel were several months old. No irritation reaction was observed.

Example C

Aliquots of either fresh gel, the present stabilized gel, or 24-hour unstabilized gel were rubbed into wounds treated in the skins of various rabbits. A sterile physiological saline solution control was run. A 72-hour punch biopsy of the wound area was taken and studied for disruption of the hornycell layer of the epidermis, scarifying, deep necrosis, area lymphatic gland swelling, and other evidence of deep toxicity. Again, both fresh and stabilized Aloe vera gel preparations produced no signs of irritation, even less than the physiological solutions, but the 24-hour unstabilized gel preparations did cause the indicated signs of necrosis.

Example 2

The procedure of Example 1 was followed except that the gel preparation was heated at 37° C. for 20 minutes in one instance and at 62° C. for 5 minutes in another instance. The gel juice was effectively stabilized in both cases, although after several weeks the 37° C. preparation assumed a pink tint and the 62° C. preparation assumed a ruddy tint. The gel was stabile and nontoxic according to the uses and tests explained in Example 1.

Example 3

The procedure of Example 1 was followed except that after addition of reagents A, B, and C, and prior to lyophilization concentration, 5 milliliters of a 0.01 milligram percent tocopherol mixture was added. The addition of the tocopherol kept the gel from changing color for at least 20 months. Samples of the preparation were exposed to air for several months but no color change was noted. The gel was stabile and nontoxic according to the uses and tests explained in Example 1.

Example 4

The procedure of Example 1 was followed except that reagent A was a 1% solution of ethylenediaminetetracetic acid and reagent C was omitted. Although the gel was effectively stabilized according to the uses and tests of Example 1, bacterial decomposition products of some of its components were observed.

Example 5

The procedure of Example 1 was followed except that 5 milliliters of 0.3 milligram percent solution Hespiraden dicalcone were used instead of Reagent B.

The above described Examples utilized gel from freshly cut Aloe vera leaves. For leaves that have been cut for over about a day, further treatment is necessary in order to prevent such bacteria as Acetobacter and Rhodopseudomonis (frequent contaminants of such preparations) from degrading certain of the gel substrate substances into breakdown products such as acetic acid and ethyl alcohol. This treatment is now described.

Example 6

The method of Example 1 was repeated, except that 21.5 milliliters of the reagent now described was added to the stabilized gel. Seventy milliliters of 70 percent sorbitol were mixed into 10 milliliters of a solution prepared by dissolving one gram of 2,6-ditertiary butyl alpha-dimethyl amino p-cresol in 50 milliliters of 95 percent ethanol, to which was added with mixing 2 milliliters of a solution prepared by dissolving 100 milligrams of the tocopherols in 20 milliliters of ethanol.

The 2,6-ditertiary butyl alpha-dimethylamino p-cresol is a deoxidant and removes any oxygen remaining in the preparation. The tocopherols, a mixture of alpha, beta, gamma and other tocopherols, are antioxidants that retard any oxidation that might subsequently occur. The sorbitol inhibits the growth of bacteria, particularly gram negative rod bacteria, of which the mentioned bacteria are samples. Sorbitol further reduces the possibility of color change due to Rhodopseudomonis polustric. The amounts described are preferential amounts in excess of what may be actually required. In some instances, simply using 0.05 milligrams percent of the tocopherols will provide sufficient protection.

As used in this application, it is intended that "nontoxid" refer to substances that do not themselves produce a primary skin irritation according to the usual tests, such as those above illustrated. It is further intended that the apparent minimum concentrations above defined not be considered as strictly limiting since it is their effective value that this invention comprehends. Obviously, as has been set forth, the makeup of one batch of the Aloe vera gel may vary from that of another batch, for the plants themselves differ as their environs differ. Accordingly, concentration values given are illustrative only of those giving positive results with the gel batches from the particularly available Aloe vera plant leaves utilized. Further, they reflect probable errors of from one to five percent due to the accuracy limitations of the equipment used to conduct the experiments.

Having described the invention in connection with certain specific embodiments thereof, it is to be understood that further modifications may now suggest themselves to those skilled in the art and it is intended to cover such modifications as fall within the scope of the appended claims.

What is claimed is:

1. The process of stabilizing the clear gel from the leaf of aloe vera which comprises:
   a. mechanically separating the nonbruised and nondiscolored aloe vera gel matrix from the outer green cortex of the aloe vera leaf;
   b. homogenizing said aloe gel matrix and adding a catalytic proportion of hydrogen peroxide thereto;
   c. heating said gel containing said oxidant to a temperature within the range of from about 35°C to about 80°C for a sufficient time to cause said gel to assume a lighter appearance;

d. adding an effective proportion relative to said oxidant of a nontoxic antioxidant to stop catalytic oxidation; and e. adding an effective proportion relative to said antioxidant of a nontoxic buffer substance to maintain the pH of the gel solution at a value between pH 4 and pH 6.

2. The process of claim 1 wherein said nontoxic antioxidant is selected from the group consisting of sorbic acid, potassium sorbate, and ethylenediaminetetraacetic acid.

3. The process of claim 2 wherein said nontoxic buffer is selected from the group consisting of ascorbic acid and phosphoric acid.

4. The process of claim 1 further comprising adding an effective proportion of a nontoxic surfactant to disrupt any formed coagulant in said gel, the surfactant being of a type that for the said proportion of buffer substance, will not change the pH of the gel solution to alkaline levels.

5. The process of claim 4 wherein said nontoxic surfactant is selected from the group consisting of cetyl alcohol and hesperidin dichalcone.

6. The process of claim 4 further comprising adding an effective proportion of tocopherol to prevent color change in the stabilized gel after processing.

7. The process of claim 4 further comprising adding to said solution:

a. sufficient sorbitol to prevent the growth therein of bacteria;

b. sufficient tocopherol to prevent oxidative decomposition of gel substances; and c. sufficient deoxidant to remove any oxygen from the preparation.

8. The process of claim 7 wherein said sorbitol is added in amounts of at least about 0.25 milligrams percent of said solution, said deoxidant is 2,6-ditertiary butyl alpha dimethylamino p-cresol added in amounts of at least about 1 milligram percent of said solution, and said tocopherol is added in amounts of at least about 0.01 milligrams percent of said solution.

9. The product produced by the process of claim 1.

10. The process of stabilizing the clear gel from the leaf of aloe vera which comprises:

a. mechanically separating the nonbruised and nondiscolored aloe gel matrix from the outer green cortex of the aloe vera leaf;

b. homogenizing said aloe gel matrix and adding to said gel a catalytic proportion of hydrogen peroxide;

c. heating said gel containing said hydrogen peroxide to a temperature within the range of from about 35°C to about 80°C for a sufficient time to cause said gel to assume a lighter appearance;

d. adding an antioxidant selected from the group consisting of sorbic acid and potassium sorbate to said gel, said antioxidant being added in an amount of at least 0.5 milligrams percent of said gel to stop catalytic oxidation; and e. adding ascorbic acid as a nontoxic buffer to said gel in an amount of at least 0.66 milligrams percent to maintain the pH of the gel at a value between pH 4 and pH 6.

* * * * *